US006993150B2

(12) United States Patent
Haynes

(10) Patent No.: US 6,993,150 B2
(45) Date of Patent: Jan. 31, 2006

(54) HALFTONE PRIMITIVE WATERMARKING AND RELATED APPLICATIONS

(75) Inventor: Mark E. Haynes, Manning, OR (US)

(73) Assignee: Digimarc Corporation, Beaverton, OR (US)

(*) Notice: Subject to any disclaimer, the term of this patent is extended or adjusted under 35 U.S.C. 154(b) by 596 days.

(21) Appl. No.: 10/052,895

(22) Filed: Jan. 17, 2002

(65) Prior Publication Data

US 2002/0105679 A1 Aug. 8, 2002

Related U.S. Application Data

(60) Provisional application No. 60/263,987, filed on Jan. 24, 2001.

(51) Int. Cl.
*G06K 9/00* (2006.01)
(52) U.S. Cl. ..................................... 382/100; 358/3.28
(58) Field of Classification Search ................ 382/100, 382/274, 232, 237; 358/3.28; 283/113; 399/180; 347/131; 345/596, 89
See application file for complete search history.

(56) References Cited

U.S. PATENT DOCUMENTS

| | | | |
|---|---|---|---|
| 5,850,481 A | 12/1998 | Rhoads | |
| 5,862,260 A | 1/1999 | Rhoads | |
| 6,092,732 A * | 7/2000 | Curry | ...................... 358/3.28 |
| 6,104,812 A | 8/2000 | Koltai et al. | |
| 6,252,675 B1 | 6/2001 | Jacobs | |
| 6,359,985 B1 | 3/2002 | Koch et al. | |
| 6,384,935 B1 | 5/2002 | Yamazaki | |
| 6,449,377 B1 * | 9/2002 | Rhoads | ........................ 382/100 |
| 6,614,914 B1 | 9/2003 | Rhoads et al. | |
| 6,690,811 B2 * | 2/2004 | Au et al. | ..................... 382/100 |
| 6,694,041 B1 * | 2/2004 | Brunk | ......................... 382/100 |
| 6,731,409 B2 * | 5/2004 | Wang | ......................... 358/3.28 |
| 6,757,406 B2 * | 6/2004 | Rhoads | ........................ 382/100 |
| 6,760,464 B2 * | 7/2004 | Brunk | ......................... 382/100 |
| 6,763,121 B1 * | 7/2004 | Shaked et al. | .............. 382/100 |
| 6,763,122 B1 * | 7/2004 | Rodriguez et al. | ........... 382/100 |
| 6,823,075 B2 * | 11/2004 | Perry | ......................... 382/100 |
| 2002/0012447 A1 | 1/2002 | Amidror et al. | |
| 2002/0054355 A1 * | 5/2002 | Brunk | ......................... 358/3.28 |
| 2003/0030271 A1 * | 2/2003 | Wicker | ........................ 283/113 |

FOREIGN PATENT DOCUMENTS

DE 19521969 2/1997

(Continued)

OTHER PUBLICATIONS

Amano, "A Feature Calibration Method for Watermarking of Document Images", Proc. 5.sup.th Intl'l Conf on Document Analysis and Recognition, 1999, pp. 91-04, Bangalore, India.

(Continued)

*Primary Examiner*—Daniel Miriam
*Assistant Examiner*—Barry Choobin
(74) *Attorney, Agent, or Firm*—Digimarc Corporation

(57) ABSTRACT

The present invention relates to a method for embedding a digital watermark into a halftone image comprised of clusters of halftone dots, which are referred to as geometric primitives. This method embeds a watermark image signal including an array of multilevel per pixel delta values by increasing or decreasing the size of a corresponding cluster of halftone dots. In particular, each delta value represents a change in luminance in one implementation, but this delta value could correspond to other color planes of a monotone or color halftone image. The watermark embedder subtly changes the halftone primitives by toggling boundary pixels on or off in a manner that grows or shrinks the primitive.

5 Claims, 1 Drawing Sheet

FOREIGN PATENT DOCUMENTS

| EP | 0493091 | 7/1992 |
|---|---|---|
| EP | 0629972 | 12/1994 |
| EP | 1152592 | 11/2001 |
| WO | WO 00/62258 | 10/2000 |
| WO | WO/0174053 | 10/2001 |

OTHER PUBLICATIONS

Baharav, "Watermarking of Dither Halftoned Images", SPIE vol. 3657, Jan. 1999, pp. 307-316.

Bender et al., "Techniques for Data Hiding," SPIE vol. 2420, Jan. 1995, pp. 164-173.

Bloomberg, "Embedding Digital Data on Paper in Iconic Text," Feb. 12-13, 1997, Proc. SPIE- Int. Soc. Opt. Eng., vol. 3027, pp. 67-80.

Brassil et al., Electronic Marking and Identification Techniques to Discourage Document Copying, Proceedings of INFOCOM '94 Conference on Computer, IEEE Commun. Soc Conference, Jun. 12-16, 1994, pp. 1278-1287.

Brassil et al., "Hiding Information in Document Images," Nov., 1995, 7 pages.

Caronni, "Assuring Ownership Rights for Digital Images," Published in the Proceedings of 'Reliable IT Systems,' VIS '95, HH. Brugemann and W. Gerhardt-Hackl (Ed.), Vieweg Publishing Company, Germany, 1995, Jun. 14, 1994, 10 pages.

Dautzenberg, "Watermarking Images," Department of Microelectronics and Electrical Engineering, Trinity College Dublin, 47 pages, Oct. 1994.

Cox et al., "A Secure, Imperceptible Yet Perceptually Salient, Spread Spectrum Watermark for Multimedia," IEEE, Southcon/96, Conference Record, pp. 192-197, 1996.

Fu et al., "Data Hiding in Halftone Images with Parity Coding," Proc. SPIE vol. 4314 (2001), pp. 360-368.

Hecht, "Embedded Data Glyph Technology for Hardcopy Digital Documents," SPIE vol. 2171, Feb. 1994, pp. 341-352.

Hsu et al., "DCT-Based Watermarking for Video," IEEE Transactions on Consumer Electronics, vol. 44, No. 1, Feb. 1998, pp. 206-216.

Knox, "Digital Watermarks Using Stochastic Screens", SPIE vol. 3018, 1997, pp. 316-322.

Koch et al., "Copyright Protection for Multimedia Data," Proc. of the International Conference on Digital Media and Electronic Publishing, Dec., 1994, Leeds, U.K., 15 pages.

Komatsu et al., "A Proposal on Digital Watermark in Document Image Communication and Its Application to Realizing a Signature," Electronics and Communications in Japan, Part 1, vol. 73, No. 5, 1990, pp. 22-33.

Komatsu et al., "Authentication System Using Concealed Image in Telematics," Memoirs of the School of Science & Engineering, Waseda Univ., No. 52, 1988, pp. 45-60.

Low, "Document Identification for Copyright Protection Using Centroid Detection", IEEE, vol. 46, No. 3, Mar. 1998, pp. 372-383.

Matsui et al., "Embedding A Watermark to Binary Pictures in a Hardcopy System," Memoirs of the National Defense Academy (Japan) vol. 36, No. 2, pp. 13-20.

Matsui et al., "Video-Steganography: How to Secretly Embed a Signature in a Picture," IMA Intellectual Property Project Proceedings, Jan. 1994, vol. 1, Issue 1, pp. 187-205.

Mei et al., "Data Hiding in Binary Text Documents," Proc. SPIE, vol. 4314 (2001), pp. 369-375.

Nakamura et al., "A Unified Coding Method of Dithered Image and Text Data Using Micropatterns," Electronics and Communications in Japan, Part 1, vol. 72, No. 4, 1989, pp. 50-56.

Nakamura et al., "A Unified Coding Method of Image and Text Data Using Discrete Orthogonal Transform," Systems and Computers in Japan, vol. 21, No. 3, 1990, pp. 87-02.

Szepanski, "A Signal Theoretic Method for Creating Forgery-Proof Documents for Automatic Verification," Proceedings 1979 Carnhan Conference on Crime Countermeasures, May 16, 1979, pp. 101-109.

Tanaka et al., "Embedding Secret Information Into a Dithered Multi-Level Image," Proc. IEEE Military Comm. Conf., Sep. 1990, pp. 216-220.

Tanaka, "Embedding the Attribute Information Into a Dithered Image," Systems and Computers in Japan, vol. 21, No. 7, 1990, pp. 43-50.

Tanaka et al., "New Integrated Coding Schemes for Computer Aided Facsimile," Proc. IEEE Int'Conf. on Sys. Integration, Apr. 1990, pp. 275-281.

Wang, "Embedding Digital Watermarks in Halftone Screens", SPIE vol. 3971, 2000, pp. 218-227.

Wu, "Data Hiding in Digital Binary Image", IEEE, 2000, pp. 393-396.

Zhao, "A WWW Service to Embed and Prove Digital Copyright Watermarks", Proc. Of the European Conf. on Multimedia Applications, May 1996, 15 pages.

* cited by examiner

HALFTONE PRIMITIVE WATERMARKING AND RELATED APPLICATIONS

TECHNICAL FIELD

This patent application claims the benefit of application Ser. No. 60/263,987, filed Jan. 24, 2001, which is hereby incorporated by reference.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 5,862,260 and 6,614,914, which are hereby incorporated by reference.

The invention provides a method for embedding a digital watermark into a halftone image comprised of clusters of halftone dots, which are referred to as geometric primitives. In the literature on clustered-dot halftone printing, these geometric primitives are sometimes referred to as halftone dots. For color halftone images, primitives of different colors (CMYK or RGB) are combined at a pixel location to form a clustered dot having a desired color. In this document, the cluster that forms a primitive is comprised of microdots referred to as halftone dots or halftone pixel dots. The method embeds a watermark image signal comprising an array of multilevel per pixel delta values by increasing or decreasing the size of a corresponding cluster of halftone dots. In particular, each delta value represents a change in luminance in one implementation, but this delta value could correspond to other color planes of a monotone or color halftone image. The watermark embedder subtly changes the halftone primitives by toggling boundary pixels on or off in a manner that grows or shrinks the primitive.

A watermark decoder detects and reads a message in the watermarked image after it is scanned from a printed object, such as a newspaper, by detecting the changes in luminance (or other color plane) in which the watermark is embedded.

Further features will become apparent with reference to the following detailed description.

DETAILED DESCRIPTION

Figure 1:
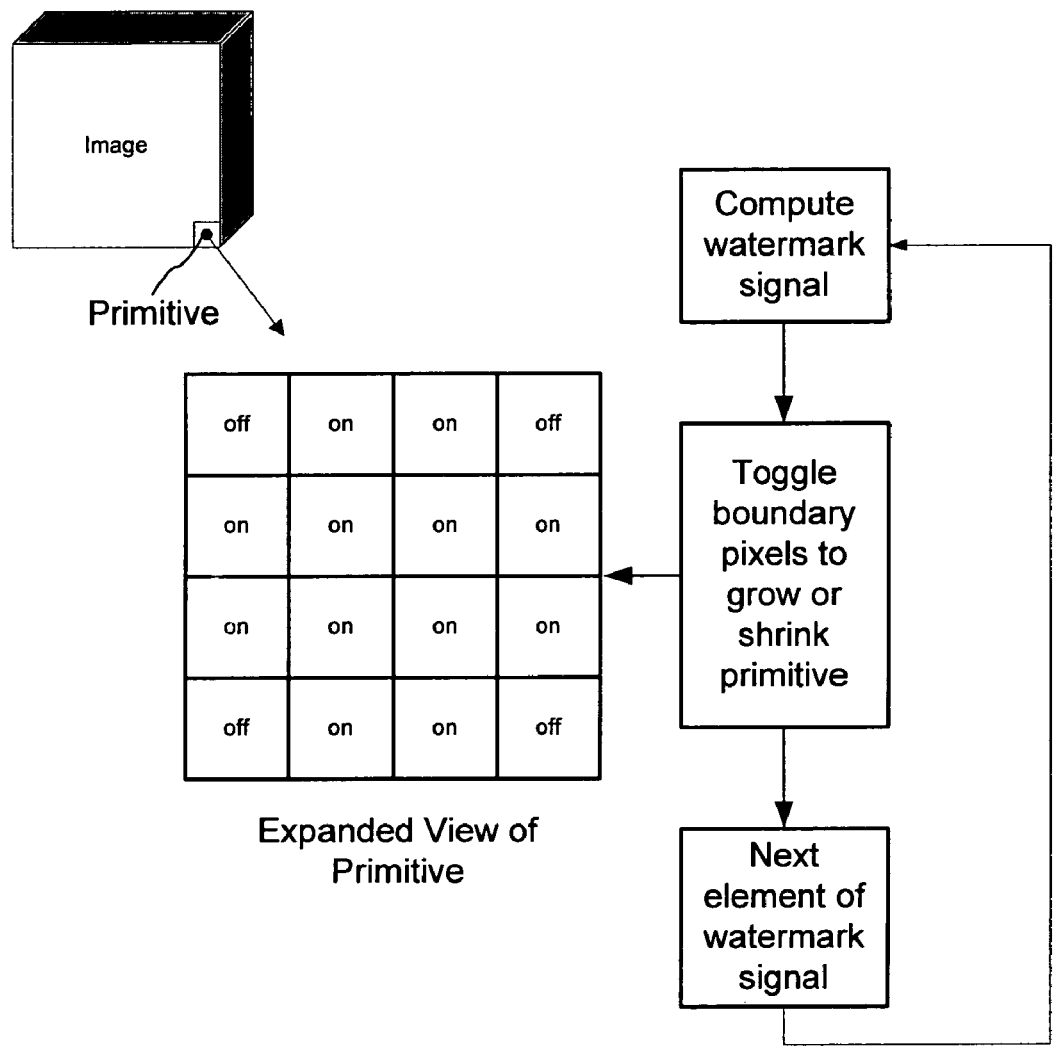
FIG. 1 is a diagram illustrating a watermark encoder method for halftone images.

The following description details methods for watermarking halftone images and related applications. A halftone image is represented as a two-dimensional array of image elements (pixels), each having a one bit binary value of one or zero. In printing or displaying such an image, each binary value corresponds to the presence or absence of a signal, such as a black or white dot. In color halftone images, each pixel location has a vector of 1 bit binary values, where the elements in the vector correspond to color components like RGB, CMYK, etc. Many digital images are represented as multilevel per pixel images, where each pixel has one or more multilevel color values (one for grayscale, and three or four typically for color). Halftone processes convert multilevel per pixel images at a source resolution to halftone images at a higher target resolution by subdividing each 2D region representing a location of a multilevel pixel image in a rectangular array into a 2D array of halftone pixel locations and selectively setting bits of the halftone locations to one or zero to represent the value of the multilevel pixel.

There are a variety of halftone processes. One technique used in newsprint, for example, is to represent multilevel pixel values as 2D geometric primitives, comprised of contiguous clusters of halftone pixel dots (e.g., black dots). These clusters are in the shape of solid color shapes, such as rectangles or polygons that appear circular from a distance. In a grayscale image, shades of gray from light (high luminance) to dark (low luminance) are represented as progressively larger solid primitives that occupy progressively larger areas of a given multilevel pixel location. These geometric primitives are typically centered within a rectangle representing the multilevel pixel location.

In one method detailed below and illustrated in FIG. 1, a watermark encoder modulates the size of halftone primitives to encode a watermark signal. This method operates on a halftone image that is in the form of a collection of geometric primitives (e.g., clusters of black halftone dots). Another input is a watermark signal, which is represented as a multilevel per pixel image at some lower resolution than the resolution of the halftone dots in the halftone image. Elements in the watermark signal represent changes in luminance of the halftone image, and each correspond to a halftone primitive comprising a cluster of halftone dots. To embed the watermark in the halftone image, the watermark encoder toggles halftone dot values at the outer boundary of a primitive to effect the desired change in luminance of the corresponding multilevel pixel value in the watermark signal. It repeats this process for each element in the watermark signal.

The effect of the watermark on a grayscale image represented as clusters of black or white halftone dots is to subtly change the luminance of the halftone image. The degree of imperceptibility depends on the magnitude of the watermark signal. The magnitude of the watermark signal is scaled, either by a user supplied global gain applied evenly across the image or regions of the image, or by an automated process that varies the gain applied to regions of the image based on a human visual system modeling of the image. One way to model the image is to compute local contrast and increase the gain in areas of high contrast.

Once watermarked, a conventional printing process prints the watermarked halftone image by applying ink dots only to areas where halftone dots are present in the digital representation of the halftone image.

To read the watermark, a digital image scanning process captures a digital image at sufficient resolution (at least as great as the resolution of the watermark signal). A watermark decoder converts the image into luminance, detects the presence and orientation of the watermark signal, and then decodes a binary message embedded in the watermark signal.

There are a number of ways to compute the watermark signal, and to decode it from a digital image scan of a printed image. Also, of course, the method described above applies to halftone images that remain in the digital domain, e.g., are not printed. Some examples of computing the watermark signal and decoding it are provided in U.S. application Ser. No. 09/503,881 and U.S. Pat. No. 5,862,260, which are incorporated by reference above.

One approach for creating the watermark signal is to take a desired binary message comprising a sequence of binary values, append known control bits, error correction encode the entire sequence, spread each bit in the sequence over a pseudorandom number (e.g., a random binary sequence), and map the resulting sequence elements to pixel locations in a 2D image. The sequence may be represented as a binary antipodal sequence of 1 and −1, where 1 corresponds to a binary 1 and −1 corresponds to a binary zero. To give the elements a multilevel value, the watermark embedder scales the antipodal values by an array of gain values, where elements in the array correspond to elements in the watermark signal. Additionally, the watermark signal may be combined with a calibration signal, such as a signal represented as a collection of delta values in the Fourier magnitude domain, with each delta value having pseudorandom phase.

To detect the watermark, a watermark detector correlates the calibration signal with the scanned version of the watermarked image to determine the original rotation, scale and origin of the watermark signal. Then, a message reader decodes the watermark message by comparing pixel values with predicted values (e.g., a local average of a neighboring pixels). If a pixel value is greater than a predicted value, it is mapped to a binary one; otherwise it is mapped to a zero. The resulting values are applied to an inverse spreading operation and then an inverse error correction coding operation. The known bits are then used to validate the message, including validating the message by checking error detection bits in an error detection process.

The following discussion illustrates an implementation in further detail. In this implementation, the primitives are rectangles and clusters of dots that approximate circles. The embedder modulates halftone primitives as follows:

1. To make primitives bigger, weight edge halftone pixels by weighting pixels in a manner that determines the priority order in which they are turned on (changed from white to black). This order is calculated to preserve the shape of the primitive. For example, the corners are given a greater weight.

2. To make primitives smaller, turn off edge pixels using a similar weighting to prioritize pixels to be changed.

3. The delta value for each watermark signal pixel indicates how many edge pixels to turn on to make a negative change in luminance, and how many to turn off to make a positive change in luminance.

4. The watermark signal is a tile of pseudorandom numbers, modulating corresponding halftone cluster sizes up or down. The tile is replicated in the host image.

5. This approach prioritizes changes along edges of clusters by making the change along one edge first, before moving to another edge. This makes the change less perceptible. In general, the priority scheme for changing edge pixels shrinks or grows a primitive uniformly only at the edge.

6. This approach allows the embedder to embed more signal strength for less visibility because it modulates the halftone cluster primitive that the image is being drawn with.

7. The weighting priority for adding or removing dots along a boundary may be generalized for all shapes or adapted to be optimized for different shapes. When optimized for different shapes, the embedder selects the weighting scheme applicable to the cluster shape being modified.

8. The weighting can be calculated with a convolution filter that establishes a sequence for turning on halftone pixels in a uniform manner to grow a halftone cluster primitive, and similarly turning off pixels on a boundary in a uniform manner to shrink a halftone cluster primitive.

9. One implementation examines horizontally and vertically adjacent pixels on cluster edges, and sums nearest neighbors (vertically adjacent and horizontally adjacent) of opposite color, distinguishing between cases for growing or shrinking a cluster. In the case where luminance is to be increased, this method prioritizes, for example, black edge pixels surrounded by more white pixels, and turns these black pixels to white first. In the case where luminance is to be decreased, this method prioritizes, for example, white pixels surrounded by more black pixels, and turns these white pixels to black first. This method prioritizes runs of horizontally and vertically adjacent edge pixels such that runs of such edge pixels are expanded outward or shrunk inward together. If the delta number of the watermark signal pixel corresponding to the cluster being examined requires that more than one edge be changed, the method iterates through the modified primitive in more than one pass. With each iteration, the method prioritizes edge pixels of the primitive cluster from the previous pass and toggles edge pixels of higher priority until the total number of edge pixel changes corresponding to the delta value is made, Combined Robust and Fragile Watermark for Authentication of Printed Objects This section describes a method for halftone watermarking to determine whether a printed image has been tampered with. In this method, the watermark embedder embeds a robust watermark signal such as the one described above that is robust to printing, scanning and geometric distortion. For each pixel in the watermark signal, the embedder adds or subtracts halftone dots in corresponding block of halftone dots to achieve a desired change in luminance. This method uses a random halftone dither pattern of dots to perform the halftone process. For each watermark signal element, the method adds or subtracts halftone dots to achieve the desired luminance change. However, the halftone patterns of the watermarked halftone image are selected to achieve the desired change in luminance and to have a predetermined dither pattern. The dither pattern is known, and may be pseudorandom.

In the watermark decoder, a detector uses the approach described above to detect the presence and orientation of the watermark. It then extracts the message carried in the robust watermark. The message may carry a key indicating the location and types of dither patterns used to create the watermarked image. Whether provided in the robust message or not, the decoder has a key that defines the dither patterns. The decoder then examines the realigned data to see whether the dither patterns are present. If they are within some tolerance or threshold settings, then the printed image is deemed authentic. If not, then it is deemed not authentic. The dither patterns used for authentication may be set within the printer of authentic objects.

Concluding Remarks

Having described and illustrated the principles of the technology with reference to specific implementations, it will be recognized that the technology can be implemented in many other, different, forms. To provide a comprehensive disclosure without unduly lengthening the specification, applicant incorporates by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method of embedding a watermark into a halftone image, said method comprising:
   providing a watermark to alter the halftone dots by toggling boundary pixels of the halftone dots, wherein the halftone dots are represented as primitives comprising contiguous clusters of halftone pixels; and
   embedding the watermark in the image by growing or shrinking the primitives through the toggling of the boundary pixels.

2. The method according to claim 1, wherein the step of embedding comprises the step of gradually changing the halftone dots.

3. A method of embedding a watermark into a halftone image, said method comprising:
   providing a watermark to alter a cluster of halftone dots by toggling boundary pixels of the halftone dots; and
   embedding the watermark in the image, including toggling boundary pixels on or off to grow or shrink the halftone dots.

4. An apparatus to embed a watermark in a halftone image, said apparatus comprising:
   means for receiving an image including primitives comprising contiguous clusters of halftone pixels; and
   an encoder to toggle halftone data values at an outer boundary of a cluster of halftone pixels of the image, the encoder operable to grow or shrink the cluster at the outer boundary to embed an element of the watermark in the image.

5. The apparatus according to claim 4, wherein said encoder effects a change in the image's luminance.

* * * * *